United States Patent
Douville

(10) Patent No.: US 11,472,704 B2
(45) Date of Patent: Oct. 18, 2022

(54) PROCESS AND SYSTEM FOR PRODUCING SODIUM HYDROSULFITE CRYSTALS

(71) Applicant: HYDRO TECHNOLOGIES (CANADA) INC., Quebec (CA)

(72) Inventor: Patrice Douville, Quebec (CA)

(73) Assignee: SILOX CANADA INC., Montreal (CA)

( * ) Notice: Subject to any disclaimer, the term of this patent is extended or adjusted under 35 U.S.C. 154(b) by 0 days.

(21) Appl. No.: 17/610,944

(22) PCT Filed: Jun. 4, 2020

(86) PCT No.: PCT/CA2020/050769
§ 371 (c)(1),
(2) Date: Nov. 12, 2021

(87) PCT Pub. No.: WO2020/248045
PCT Pub. Date: Dec. 17, 2020

(65) Prior Publication Data
US 2022/0144635 A1    May 12, 2022

Related U.S. Application Data

(60) Provisional application No. 62/859,381, filed on Jun. 10, 2019.

(51) Int. Cl.
*C01B 17/66*    (2006.01)
(52) U.S. Cl.
CPC .................................... *C01B 17/66* (2013.01)
(58) Field of Classification Search
CPC ............ C01D 5/16; C01B 17/62; C01B 17/66
See application file for complete search history.

(56) References Cited

U.S. PATENT DOCUMENTS

| 3,054,658 A | 9/1962 | Crawford et al. |
| 3,298,796 A | 1/1967 | Van Damme-Van Weele et al. |
| 4,388,291 A | 6/1983 | Arakawa et al. |
| 4,590,058 A | 5/1986 | Cawlfield |
| 5,296,210 A | 3/1994 | Oglesby |

FOREIGN PATENT DOCUMENTS

| CA | 896842 A | 4/1972 |
| CA | 2050838 A1 | 3/1992 |
| CA | 2050383 A1 | 3/1993 |

OTHER PUBLICATIONS

International Search Report of International Application No. PCT/CA2020/050769; Search conducted on Aug. 6, 2020 by Authorized Office Stewart Parsons.
Examination Report for corresponding Canadian Application No. 3140232, dated Jan. 14, 2022, 6 pages.

*Primary Examiner* — Timothy C Vanoy
(74) *Attorney, Agent, or Firm* — BCF LLP

(57) ABSTRACT

A process and a system allow producing sodium hydrosulfite crystals. A suspension containing sodium hydrosulfite is provided. The sodium hydrosulfite crystals are separated from a remainder of the suspension. The separated sodium hydrosulfite crystals are cooled to a stable temperature. The suspension may be obtained by raising a pH and lowering a temperature of a solution containing sodium hydrosulfite. A partial precipitation of the sodium hydrosulfite to form the crystals may be facilitated by addition of a nucleating agent to the suspension.

20 Claims, 4 Drawing Sheets

PROCESS AND SYSTEM FOR PRODUCING SODIUM HYDROSULFITE CRYSTALS

CROSS-REFERENCE

The present application claims priority from U.S. Provisional Patent Application Ser. No. 62/859,381, filed on Jun. 10, 2019, the disclosure of which is incorporated by reference herein.

TECHNICAL FIELD

The present disclosure relates to the field of industrial processes. More specifically, the present disclosure relates to a process and a system for producing sodium hydrosulfite crystals.

BACKGROUND

Sodium hydrosulfite ($Na_2S_2O_4$), also called sodium dithionite, is a water soluble, white crystalline powder and is conventionally used in various industrial applications, for example as a reducing or whitening agent in paper production.

Currently, sodium hydrosulfite for use as a reducing agent is sold either in solid anhydrous form ($Na_2S_2O_4$) form, commonly known as hydrosulfite powder, or as aqueous solutions containing less than 15% by weight of hydrosulfite. Industrial clients find that hydrosulfite solutions are convenient given that they can directly use such solutions with limited handling or transformation at their sites. Hydrosulfite solutions are delivered in tank trucks that are unloaded in dedicated tanks at the client premises. The solutions can be simply pumped to injection points as required by their industrial processes. However, an important drawback of hydrosulfite solutions relates to the large proportion of water in the solutions. The important proportion of water in hydrosulfite solutions implies a high cost of transportation. This cost becomes prohibitive when there are long distances between production sites and usage sites for hydrosulfite solutions.

Hydrosulfite powder does not suffer from the same disadvantage in terms of cost of transportation. In general, the concentration of sodium hydrosulfite in the powder is between 85 and 92%, depending on an amount of stabilizing agent incorporated in the product. Hydrosulfite powder is conventionally prepared by evaporation under vacuum, the resulting product being washed in an alcohol, for example methanol. Energy consumption required for evaporation and for alcohol distillation (for its reuse) is very significant and liquid waste generated by the powder generation process needs to be treated with respect to the environment.

Solid hydrosulfite is a Class 4.2 hazardous material because it is spontaneously combustible. To mitigate hazards, hydrosulfite powder is conventionally transported in semi-bulk fashion, using Intermediate Bulk Containers (IBC), preferably using metal alloy IBCs that are not combustible. Acquiring, maintaining and certifying a fleet of IBC containers is very expensive. Hydrosulfite solutions are prepared on site from the hydrosulfite powder and water. Storage and handling of the hydrosulfite powder on site is inherently hazardous due to potential for accidental fires and/or release of noxious gases, for example sulfur dioxide ($SO_2$).

Therefore, there is a need for improvements that compensate for problems related to the cost of transportation of sodium hydrosulfite in liquid form, to the energy consumption required to produce sodium hydrosulfite in solid form, to the generation of liquid waste in the production of sodium hydrosulfite in solid form, and to the safety hazards related to the transport and handling of sodium hydrosulfite in solid form.

SUMMARY

According to the present disclosure, there is provided a process for producing sodium hydrosulfite crystals. The process comprises:
 providing a suspension containing sodium hydrosulfite;
 separating the sodium hydrosulfite crystals from a remainder of the suspension; and
 cooling the separated sodium hydrosulfite crystals to a stable temperature.

In some implementations of the present technology, providing the suspension comprises raising a pH of a solution containing sodium hydrosulfite; and lowering a temperature of the solution to form the suspension.

In some implementations of the present technology, the process further comprises, after forming the suspension, adding a nucleating agent to the suspension to initiate a partial precipitation of the sodium hydrosulfite to form the sodium hydrosulfite crystals.

In some implementations of the present technology, the nucleating agent comprises sodium carbonate.

In some implementations of the present technology, the process further comprises filtering a slurry containing sodium hydrosulfite to provide the solution.

In some implementations of the present technology, filtering the slurry comprises using a filter-press to filter the slurry.

In some implementations of the present technology, filtering the slurry further comprises extracting zinc oxide contained in the slurry.

In some implementations of the present technology, the process further comprises collecting the extracted zinc oxide.

In some implementations of the present technology, raising the pH of the solution comprises adding sodium hydroxide to the solution.

In some implementations of the present technology, the pH of the solution is raised before lowering the temperature of the solution.

In some implementations of the present technology, the pH of the solution is raised to a range between 12 and 14.

In some implementations of the present technology, the pH of the solution is raised to a range between 12.5 and 13.5.

In some implementations of the present technology, the temperature of the solution is lowered in an agitated cooling tank or in a cooling crystallizer to form the suspension.

In some implementations of the present technology, the temperature of the solution is lowered to a range between −6° C. and 10° C.

In some implementations of the present technology, the temperature of the solution is lowered to a range between 0° C. and 4° C.

In some implementations of the present technology, providing the suspension comprises providing a solution containing sodium formate (HCOONa), and reacting the solution with sulfur dioxide (SO2) dissolved in methanol.

In some implementations of the present technology, the sodium hydrosulfite crystals are concentrated by their separation from the remainder of the suspension.

In some implementations of the present technology, the sodium hydrosulfite crystals are separated from the remainder of the suspension using a separator selected from a decanter centrifuge, a filter-press, a Nutsche filter, a disc filter, and a belt filter.

In some implementations of the present technology, the stable temperature of the sodium hydrosulfite crystals is −18° C. or lower.

In some implementations of the present technology, the stable temperature of the sodium hydrosulfite crystals is −12° C. or lower.

In some implementations of the present technology, the process further comprises collecting the remainder of the suspension as a liquid mixture containing an unseparated portion of sodium hydrosulfite initially contained in the suspension.

In some implementations of the present technology, a major fraction of the sodium hydrosulfite crystals are dihydrate sodium hydrosulfite crystals.

In some implementations of the present technology, the process further comprises adding stabilizers to the sodium hydrosulfite crystal after separation from the remainder of the suspension.

According to the present disclosure, there is also provided a system for producing sodium hydrosulfite crystals. The system comprises:

a storage adapted to provide a suspension containing sodium hydrosulfite;

a separator adapted to receive the suspension from the storage and to separate the sodium hydrosulfite crystals from a remainder of the suspension; and a chiller adapted to receive the separated sodium hydrosulfite crystals from the separator and to cool the separated sodium hydrosulfite crystals to a stable temperature.

In some implementations of the present technology, the storage comprises a cooling tank adapted to receive a solution containing sodium hydrosulfite and to lower a temperature of the solution, and the system further comprises a first feeder operatively connected to the cooling tank and adapted to add a pH raising compound to the solution, and a second feeder operatively connected to the cooling tank and adapted to add a nucleating agent to the solution to cause a partial precipitation of the sodium hydrosulfite to form the suspension.

In some implementations of the present technology, the cooling tank is an agitated cooling tank.

In some implementations of the present technology, the cooling tank comprises a cooling crystallizer.

In some implementations of the present technology, the cooling tank comprises a Nutsche filter.

In some implementations of the present technology, at least one of the first and second feeders is a hopper.

In some implementations of the present technology, the system further comprises a barrel adapted to provide a slurry containing sodium hydrosulfite, a filter-press adapted to receive the slurry from the barrel, filter the slurry to extract the solution, and transfer the solution to the storage.

In some implementations of the present technology, the filter-press is adapted to separate zinc oxide contained in the slurry from the solution.

In some implementations of the present technology, the system further comprises a container adapted to receive the zinc oxide from the filter-press.

In some implementations of the present technology, the system further comprises a reservoir operatively connected to the separator and adapted to collect the remainder of the suspension, the remainder of the suspension forming a liquid mixture containing a portion of the sodium hydrosulfite that is not separated among the sodium hydrosulfite crystals.

In some implementations of the present technology, the separator is selected from a decanter centrifuge, a filter-press, a Nutsche filter, a disc filter, and a belt filter.

In some implementations of the present technology, the storage comprises a reactor adapted to receive a first solution containing sodium formate (HCOONa), receive a second solution containing sodium dioxide (SO2) dissolved in methanol, and produce the suspension by reacting the first and second solutions.

In some implementations of the present technology, the chiller is selected from a scraped surface heat exchanger, a screw heat exchanger, a cryogenic freezer, a Nutsche filter, a $N_2$ chiller and a $NH_3$ chiller.

In some implementations of the present technology, the system further comprises a valve configured to allow a transfer of the suspension from the storage to the separator when the valve is opened.

In some implementations of the present technology, the system further comprises a controller operatively connected to the storage, the separator and to the chiller, the controller comprising a processor, and a non-transitory computer-readable medium having stored thereon machine executable instructions for causing the system to perform the process for producing sodium hydrosulfite crystals when the machine executable instructions are executed by the processor.

In some implementations of the present technology, the system further comprises a valve connecting the storage to the separator, a controller operatively connected to the storage, the valve, the separator and to the chiller, the controller being configured to cause an opening of the valve to allow a transfer of the suspension from the storage to the separator, initiate an operation of the separator when the suspension is received at least in part of the separator, and initiate an operation of the chiller when separated sodium hydrosulfite crystals are received at least in part in the chiller.

In some implementations of the present technology, the system further comprises a first sensor of a level of the suspension in the storage and a second sensor of a temperature of the suspension in the storage, the controller being configured to cause an opening of the valve to allow a transfer of the suspension from the storage to the separator when, concurrently, the first sensor indicates that there is a sufficient amount of suspension in the storage and the second sensor indicates that the suspension is at a sufficiently low temperature.

In some implementations of the present technology, the system further comprises a third feeder adapted to add stabilizing agents to the sodium hydrosulfite crystals when separated from the remainder of the suspension.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Figure 1:
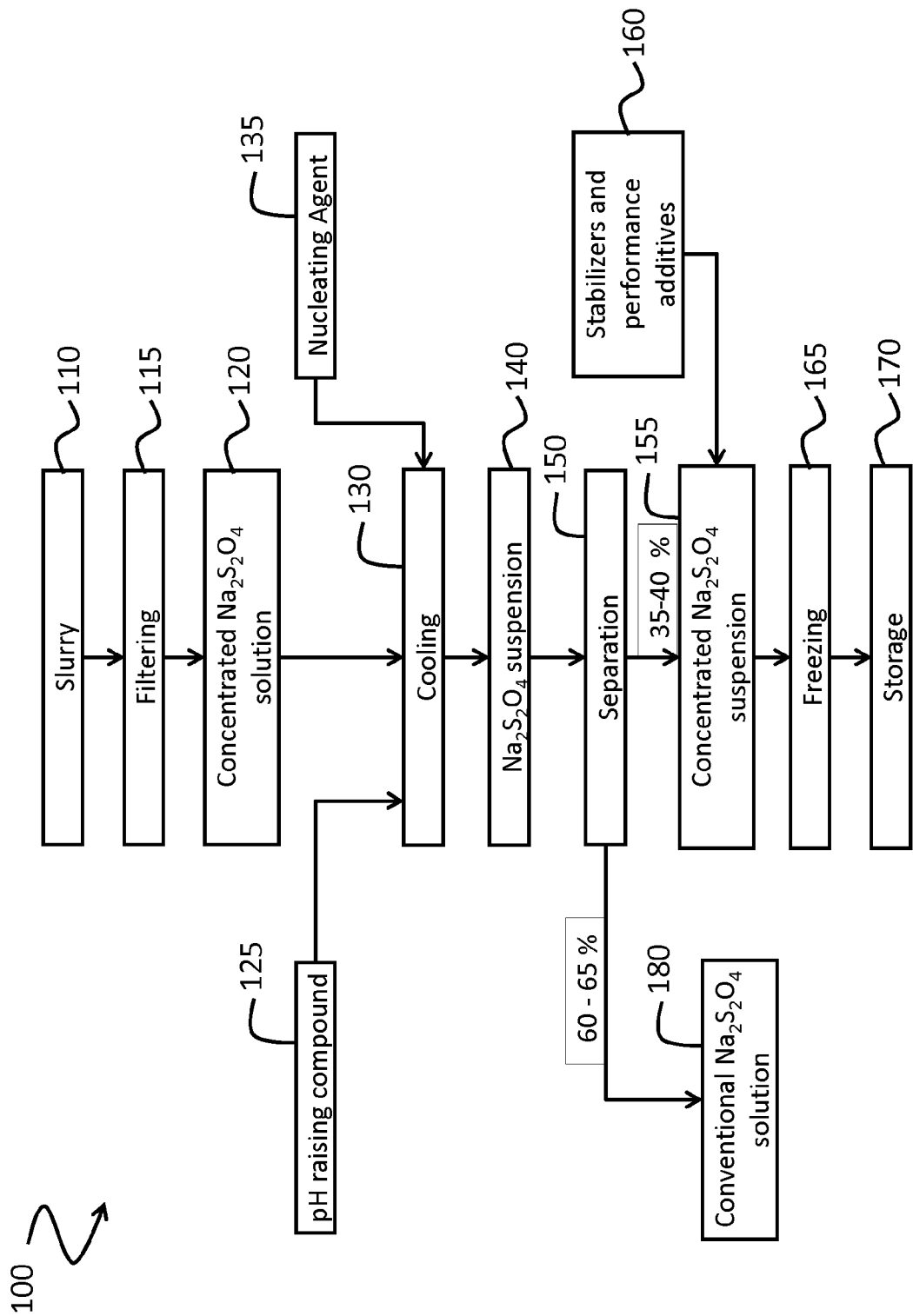
FIG. 1 is a high-level schematic block diagram illustrating an industrial process for producing sodium hydrosulfite crystals according to an embodiment.

Various aspects of the present disclosure generally address one or more of the problems related to the cost of transportation of sodium hydrosulfite in liquid form, to the energy consumption required to produce sodium hydrosulfite in solid form, to the generation of liquid waste in the production of sodium hydrosulfite in solid form, and to the safety hazards related to the transport and handling of sodium hydrosulfite in solid form.

Generally speaking, the present technology involves separating sodium hydrosulfite crystals from a suspension containing sodium hydrosulfite. The separated crystals are then cooled to a stable temperature to mitigate the related safety hazards.

In an embodiment, the suspension is provided by raising a pH and lowering a temperature of a water-based solution containing sodium hydrosulfite, causing the solution to become supersaturated in sodium hydrosulfite. When the solution is sufficiently cold, a nucleating agent is added to the solution. This action initiates a partial precipitation of the sodium hydrosulfite. The precipitation continues until the solution reaches phase equilibrium and turns into the suspension. Within the suspension, a portion, for example between 35 and 40 percent of the sodium hydrosulfite, has precipitated in the form of sodium hydrosulfite crystals. Most of the precipitate is in the form of dihydrate sodium hydrosulfite crystals; in the present disclosure, the expression "sodium hydrosulfite crystals" includes blends of sodium hydrosulfite crystals and of dihydrate sodium hydrosulfite crystals. The crystals are separated from a remainder of the suspension and collected. The collected crystals are cooled to a stable and safe temperature, allowing transportation of the product in refrigerated form.

Following the separation, a remainder of the suspension forms a liquid mixture that contains about 60 to 65 percent of the sodium hydrosulfite contained in the original solution. This product can be valorized, being for example shipped over relatively short distances from its production facility, as this option may remain economically viable.

In an aspect, when compared to the conventional practice of using evaporation under vacuum to produce hydrosulfite powder, cooling of the solution to provide the suspension consumes much less energy. For example and without limitation, it has been shown in an industrial operation that between 4 and 5 tons of water vapor are required to crystalize and dry one ton of hydrosulfite powder, which translate in about 650 kW of energy consumption to obtain this much water vapor. Is it estimated that 120 kW of energy will suffice to produce one ton of frozen hydrosulfite crystals using the present technology.

In another aspect, forming the suspension by reacting sodium formate with sodium dioxide also reduces energy consumption. In yet another aspect, the process for producing sodium hydrosulfite crystals greatly minimizes an amount of effluent to be disposed when compared to conventional processes. The present process is therefore environmentally friendly.

Figure 2:
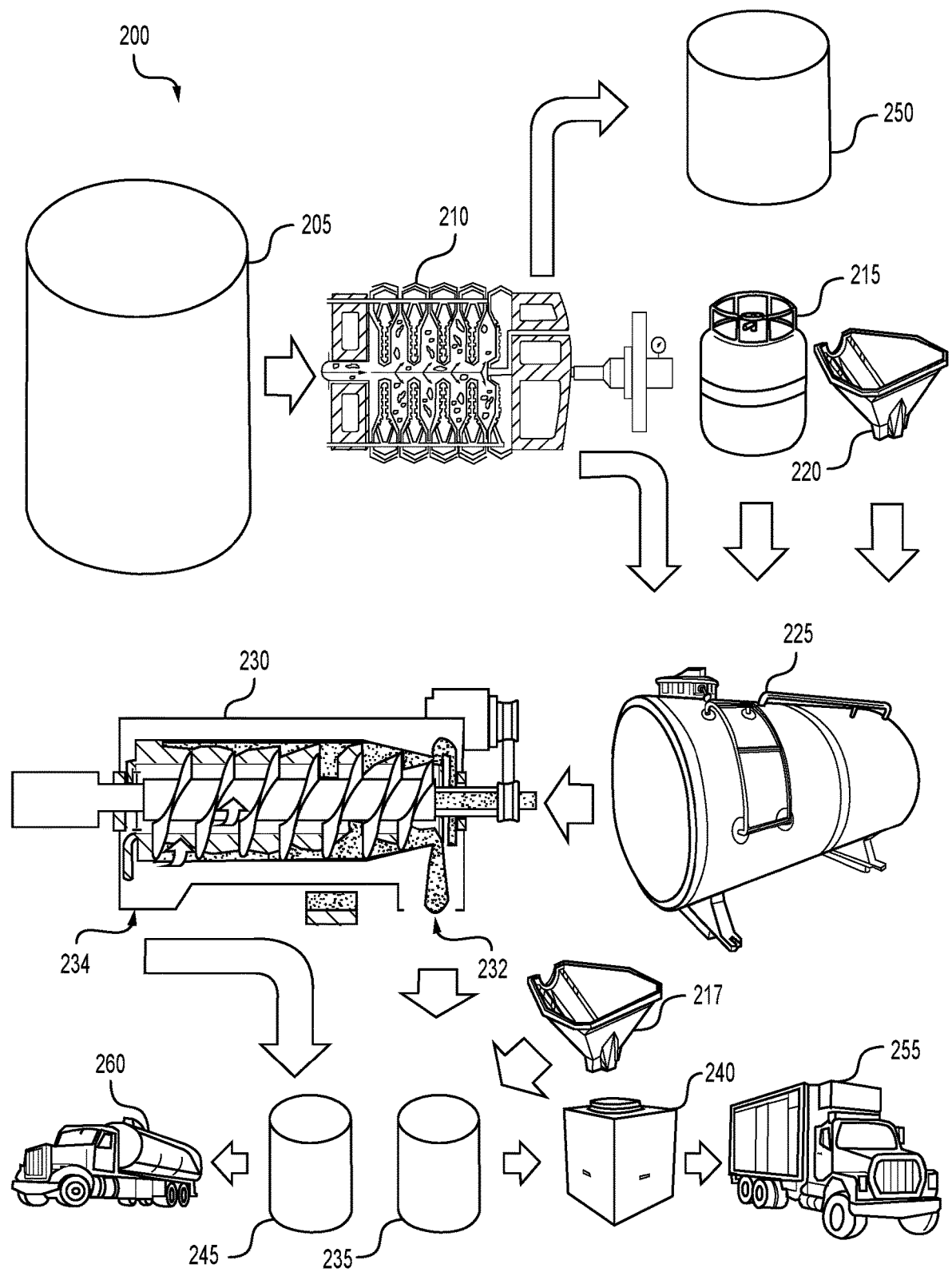
FIG. 2 is a schematic block diagram illustrating components of a system for producing sodium hydrosulfite crystals according to an embodiment.

Referring now to the drawings, FIG. 1 is a high-level schematic block diagram illustrating an industrial process for producing sodium hydrosulfite crystals according to an embodiment. A process 100 comprises a plurality of operations, some of which may be executed in variable order, some of the operations possibly being executed concurrently, some of the operations being optional. In an embodiment, the process 100 starts with the provision 110 of an original slurry containing sodium hydrosulfite. The slurry may be filtered 115 for providing a concentrated sodium hydrosulfite solution 120. Generally, the concentration of sodium hydrosulfite in the solution may be in a range of about 210 to 250 grams per liter (g/l). In an example, about 5810 liters of solution containing about 1250 kg of sodium hydrosulfite is provided. An initial temperature of the solution may be in a range between 30 and 40° C. The solution is transferred from a barrel (FIG. 2), optionally passing through a filter-press (FIG. 2) before reaching a cooling apparatus (FIG. 2).

A pH raising compound 125 may be added to the solution so that a pH of the solution is raised to a range of about 12 to 14, the pH of the solution being raised for example to a range between 12.5 and 13.5. The solution is cooled 130 to a low temperature. In a non-limiting example, the solution is cooled until it reaches a temperature in a range between 0 and 4° C. A low temperature of the solution facilitates the generation of hydrosulfite crystals. However, the temperature of the solution is maintained above a point about −6° C. where water crystals could be formed in the solution. Cooling of the solution may take place after the addition of the pH raising compound to facilitate dissolution of the raising compound in the solution.

Once the solution has sufficiently cooled, a nucleating agent 135 may be added to the solution. This action causes the precipitation of sodium hydrosulfite crystals, which are mostly in dihydrate form, turning the solution into a suspension 140 containing the sodium hydrosulfite crystals. Depending on various conditions, including the temperature reached by the suspension in the cooling operation 130, about 35 to 40% of the sodium hydrosulfite present in the concentrated sodium hydrosulfite solution 120 is expected to precipitate in the form of crystals.

A separation process 150 is then used to separate the crystals from a remainder of the suspension. A concentrated suspension comprising about 40 to 65% of crystals in water is then collected 155. Stabilizers and/or performance additives may be added 160 to the sodium hydrosulfite crystals. A non-limiting example of stabilizers (also called stabilizing agents) includes sodium carbonate ($Na_2CO_3$, also called washing soda, soda ash or soda crystals). Non-limiting examples of performance additives include ethylenediamine-tetraacetic acid disodium salt (EDTA), diethylenetriamine-pentaacetic acid pentasodium salt (DTPA) and sodium tripolyphosphate (STPP). Adding the stabilizers and/or performance additives as they are being collected 155 may facilitate their homogeneous spreading throughout the sodium hydrosulfite crystals. The concentrated suspension may then be chilled 165 to form stable sodium hydrosulfite crystals. The chilled and stable sodium hydrosulfite crystals are placed in a stable (e.g. cold) storage 170. In this state, the sodium hydrosulfite crystals now may be handled and transported at greatly reduced hazard levels.

A remainder of the solution still contains about 60 to 65% of the original sodium hydrosulfite in conventional liquid form 180. This liquid may be collected and valorized.

In a non-limiting example, about 440 to 500 kg of dihydrate sodium hydrosulfite crystals are collected. In the same non-limiting example, about 750 to 810 kg of the 1250 kg of sodium hydrosulfite contained in the original solution remains in about 5035 liters of liquid with a 155 g/l concentration of sodium hydrosulfite.

FIG. 2 is a schematic block diagram illustrating components of a system for producing sodium hydrosulfite crystals according to an embodiment. A system 200 implements an embodiment of the industrial process for producing sodium hydrosulfite crystals introduced in the description of FIG. 1. Some of the components of the system 200 are optional. As illustrated, the system 200 includes a barrel 205, a filter-press 210, first and second feeders, for example a bucket 215 and a hopper 220, a cooling apparatus that may for example be an agitated cooling tank 225, a separator that may for example be a decanter centrifuge 230, a container 235, a chiller 240, a reservoir 245, and another container 250.

In operation, a slurry containing sodium hydrosulfite is transferred from the barrel 205 into the filter-press 210. In an embodiment, the slurry may also contain zinc oxide. In this embodiment, the filter-press 210 filters the slurry to separate the zinc oxide contained in the slurry. The zinc oxide is directed by the filter-press 210 into the container 250 for eventual valorization.

Filtering of the slurry in the filter-press 210 produces a solution that contains sodium hydrosulfite. In another embodiment, the solution containing sodium hydrosulfite may be obtained from other sources without having to filter a slurry containing sodium hydrosulfite. Regardless, this solution is transferred into the agitated cooling tank 225. A pH raising compound, for example sodium hydroxide (NaOH, also called lye or caustic soda), sodium carbonate, or potassium hydroxide (KOH, also called caustic potash), is transferred from the bucket 215 into the agitated cooling tank 225, in view or raising the pH of the solution to a range between 12 and 14, for example a pH of 13. A temperature of the solution is lowered in the agitated cooling tank 225, from an initial temperature of about to 30° C. to 40° C. to a range between −6° C. and 10° C., for example between 0° C. and 4° C. The pH raising compound may be added to the solution before lowering of the temperature of the solution. Instead of the agitated cooling tank 225, use of a cooling crystallizer or of a Nutsche filter is also contemplated.

Once the solution has reached the intended low temperature, a nucleating agent, for example sodium carbonate, is transferred from the hopper 220 to the agitated cooling tank 225. This action causes a partial crystallization of the sodium hydrosulfite present in the solution, the solution now turning into a suspension containing a volume of sodium hydrosulfite crystals. Following this partial crystallization, the suspension is transferred to the decanter centrifuge 230.

It should be noted that the suspension containing sodium hydrosulfite may be generated in other manners, for example, by providing a solution containing sodium formate (HCOONa) to a reactor (not shown) and reacting that solution with another solution containing sulfur dioxide ($SO_2$) dissolved in methanol. That suspension may be placed in a storage and then transferred to the separator, where the sodium hydrosulfite crystals may be further concentrated by their separation from the remainder of the suspension. The separator may for example be the decanter centrifuge 230 illustrated on FIG. 2. Use of another filter-press, a Nutsche filter, a disc filter, or a belt filter, to separate the sodium hydrosulfite crystals from the remainder of the suspension is also contemplated. Regardless, a concentrated suspension containing sodium hydrosulfite and water is expelled from a first output 232 of the decanter centrifuge 230 and received in the container 235. In an embodiment, the concentrated suspension containing sodium hydrosulfite and water may be frozen in the chiller 240, which may for example be a scraped surface heat exchanger, or in a screw heat exchanger, a cryogenic freezer, a Nutsche filter, a $N_2$ chiller and a $NH_3$ chiller. The crystals may be stabilized by lowering their temperature further in the chiller 240, for example to −12° C. or lower. Given that it may be difficult to ensure homogeneity of the temperature of the crystals, an embodiment may lower the temperature of the crystals to −18° C. or lower. A third feeder 217 may add stabilizing agents and/or additives to the crystals, at or after the first output 232 of the decanter centrifuge 230, in order to enhance their stabilization. The sodium hydrosulfite crystals may be safely transported to its destination on a refrigerated truck 255.

A remainder of the suspension, which still contains a significant sodium hydrosulfite concentration, is expelled in the form of a liquid mixture from a second output 234 of the decanter centrifuge and received in the reservoir 245. The liquid mixture still contains a significant amount of sodium hydrosulfite and may be validated and shipped on a tank truck 260 for use in the conventional manner.

Figure 3:
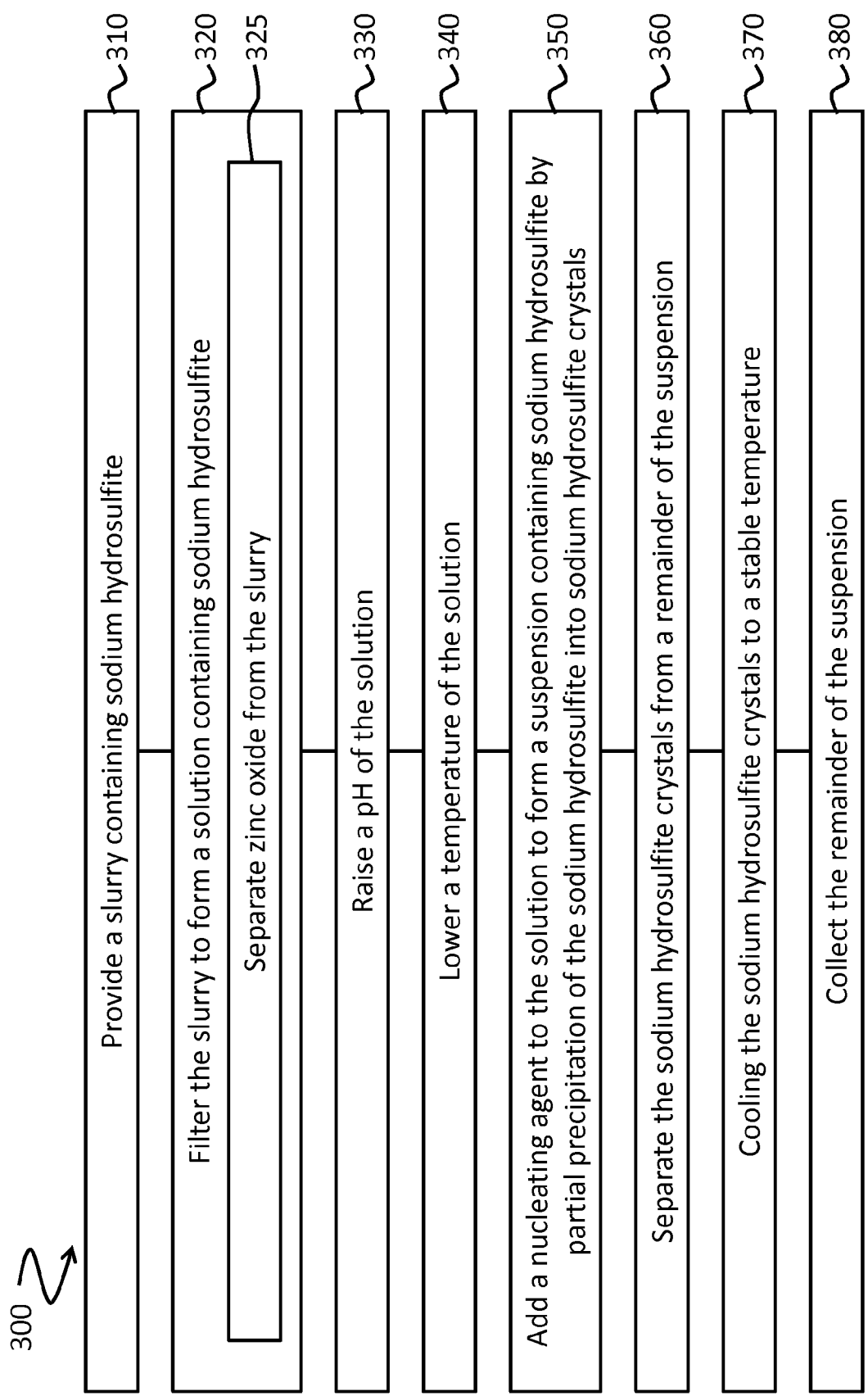
FIG. 3 is a sequence diagrams showing operations of the process for producing sodium hydrosulfite crystals according to an embodiment.

FIG. 3 is a sequence diagrams showing operations of the process for producing sodium hydrosulfite crystals according to an embodiment. On FIG. 3, a sequence 300 comprises a plurality of operations, some of which may be executed in variable order, some of the operations possibly being executed concurrently, some of the operations being optional.

Operation 310 comprises the provision of a slurry containing sodium hydrosulfite in the barrel 205. The slurry may be filtered in the filter-press 210 at operation 320. Operation 320 may comprise sub-operation 325 in which zinc oxide is separated from the slurry by the filter-press 210 and stored in the container 250 for eventual valorization. A solution containing sodium hydrosulfite is expelled from the filter press 210 following operation 320.

A pH of the resulting solution is raised by the addition of a pH raising compound at operation 330. This operation may be performed while the solution rests in the agitated cooling tank 225 by adding sodium hydroxide (NaOH) from the bucket 215 into the solution. The pH of the solution may be raised to a range between 12 and 14, for example 13. At operation 340, a temperature of the solution is lowered by action of the agitated cooling tank 225. It may be noted that the pH of the solution may be raised at operation 330 before lowering the temperature of the solution at operation 340. The temperature of the solution may be lowered to a range between −6° C. and 10° C., for example to a range between 0° C. and 4° C.

After the temperature of the solution has been lowered, a nucleating agent, for example sodium carbonate, is added from the hopper 220 to the solution contained in the agitated cooling tank 225 at operation 350. This causes the formation of a suspension containing sodium hydrosulfite crystals by partial precipitation of the sodium hydrosulfite contained in the solution into sodium hydrosulfite crystals, a major fraction of which are in the form of dihydrate sodium hydrosulfite crystals. In the present context, using the term 'major fraction' should be understood to mean that a large part, generally most, of the sodium hydrosulfite crystals are in the form of dihydrate sodium hydrosulfite crystals.

At operation 360, the sodium hydrosulfite crystals are separated from a remainder of the suspension in the decanter centrifuge 230. The temperature of the separated sodium hydrosulfite crystals may be lowered further to a stable temperature at operation 370, for example −12° C. or lower if the temperature of the sodium hydrosulfite crystals is relatively homogeneous, or −18° C. or lower in case where the temperature of the sodium hydrosulfite crystals is not verified to be homogeneous. At operation 380, the remainder of the suspension may be collected for valorization as a liquid mixture containing an unseparated portion of sodium hydrosulfite initially contained in the suspension.

Modifications to the system 200 and to the sequence 300 may be contemplated. For instance, the filter-press 210 may be substituted by another type of filter, for example a vacuum, centrifugal or gravity filter, or may be omitted, for example the barrel 205 directly provides the solution containing sodium hydrosulfite. Non-agitated cooling apparatuses may replace the agitated cooling tank 225. The nucleating agent and the pH raising compound may be fed using pumps, belt or apron feeders, drum feeders, pneumatic or vacuum feeders, screw-type feeders, and vibratory feeders instead of the bucket 215 and the hopper 220. The pH raising compound may be added to the solution before transfer of the solution in the agitated cooling tank 225. The suspension containing sodium hydrosulfite may be formed in other manners, for example by providing a solution containing sodium formate (HCOONa) and reacting that solution with another solution containing sulfur dioxide ($SO_2$) dissolved in methanol. The separation operation 360 may be performed by a compression filter, a pressure filter, a hydrocyclone, a flocculator, or any rapid filtration mechanism instead of the decanter centrifuge 230. The container 235 carrying the sodium hydrosulfite crystals may be loaded on the refrigerated truck 255 without being first chilled by the chiller 240, provided that safe loading measures are used and that the refrigerated truck 255 has sufficient cooling capabilities to stabilize the crystals.

Figure 4:
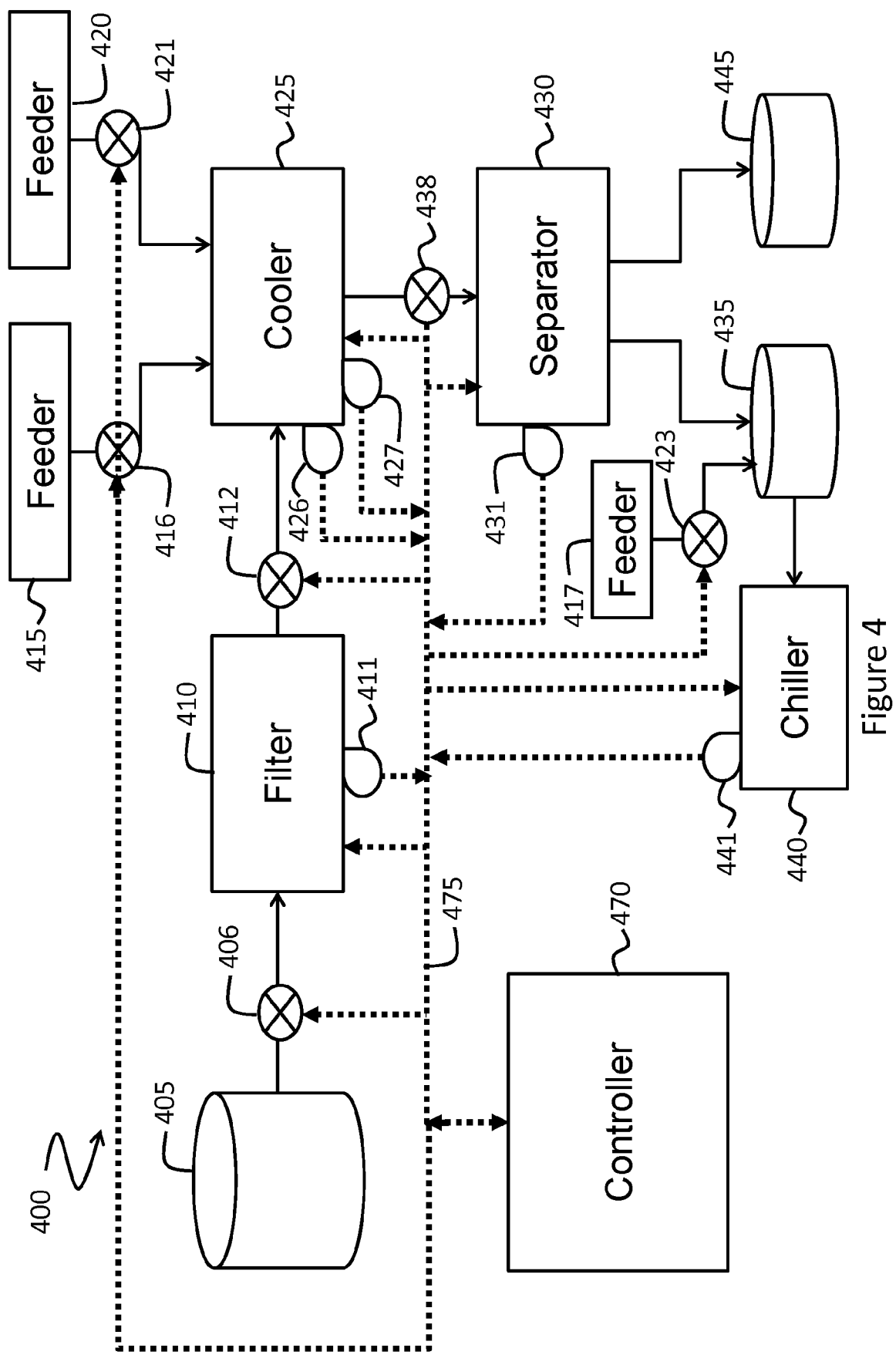
FIG. 4 is a schematic block diagram illustrating components of a system for producing sodium hydrosulfite crystals having a controller controlling its operations according to another embodiment.

FIG. 4 is a schematic block diagram illustrating components of a system for producing sodium hydrosulfite crystals having a controller controlling its operations according to another embodiment. Several of the components of the system 200 from FIG. 2 are reproduced in a system 400 of FIG. 4, some of which are presented using generic names. The system 400 comprises a barrel 405, a filter 410, feeders 415, 417 and 420, a cooling tank 425, a separator 430, a container 435, a chiller 440 and a reservoir 445. Also shown is a controller 470 that is operatively connected, via a control bus 475, to the barrel 405, the filter 410, the feeders 415 and 420, the cooling tank 425, the separator 430 and the chiller 440. On the control bus 475, arrows on the dashed lines are intended to illustrate signal directions so that, in general, measurement signals are emitted from various sensors toward the controller 470 and control signals are emitted from the controller 470 toward the various operative components of the system. Arrows in solid lines between the barrel 405, the filter 410, the feeders 415, 417 and 420, the cooling tank 425, the separator 430, the container 435, the chiller 440 and the reservoir 445 indicate a flow direction of the slurry, the suspension, the solution or of the crystals.

The controller 470 includes one or more processors (not shown) and one or more memory devices (not shown). The one or more memory devices contain one or more non-transitory computer-readable media having stored thereon machine executable instructions that can be executed by the one or more processors. Summarily, the one or more processors of the controller 470 may execute these machine executable instructions to perform some or all of the operations of the sequence 300 (FIG. 3).

In an embodiment, use of the controller 470 favors control of a consistency and a turbidity of the suspension containing sodium hydrosulfite, as well as a moisture level and sodium hydrosulfite proportion in the crystals. The controller 470 receives readings from various sensors including a sensor 411 of a pressure in the filter 410, a sensor 426 of a level of the suspension and a sensor 427 of a temperature of the suspension in the cooling tank 425, a sensor 431 of a pressure in the separator 430, and a sensor 441 of a temperature of the sodium hydrosulfite crystals in the chiller 440.

The controller 470 contains an internal programming that uses these readings to control a valve 406 for transferring the slurry from the barrel 405 to the filter 410, initiate and stop as required operation of the filter 410, and control a valve 412 for transferring the solution from the filter 410 to the cooling tank 425. A pressure reading from the sensor 411 may be used to determine whether to open or close the valve 406 and allow more slurry to reach the filter 410 without overloading it. In a similar fashion, a reading of a level of suspension in the cooling tank 425 from the sensor 426 may be used to determine whether to open or close the valve 412 and allow more solution to reach the cooling tank 425 without causing an overflow.

The controller 470 controls a valve 416 for transferring a predetermined amount of pH raising compound from the feeder 415 to the cooling tank 425. Alternatively, the controller 470 may directly control another type of feeder used in place of the feeder 415 when a particular feeder type operates without a valve. The amount of pH raising compound added to the cooling tank 425 may be predetermined. Alternatively, use of a pH meter (not shown) to measure the pH of the solution in the cooling tank 425 may be contemplated.

The controller 470 activates the cooling tank 425, for example after the addition of the pH raising compound to the solution. The controller 470 receives a reading of the temperature of the solution from the sensor 427. Once the desired temperature is met, the controller 470 opens the valve 421 for transfer of a predetermined amount of nucleating agent from the feeder 415 to the cooling tank 425.

Following a delay allowing for crystallization of the sodium hydrosulfite, the controller 470 opens a valve 428 to transfer the cold suspension from the cooling tank 425 to the separator 430. The controller 470 also initiates an operation of the separator 430. A rate of transfer of the cold suspension from the cooling tank 425 to the separator 430 may be controlled by the controller 470 at least in part based on a reading of a pressure in the separator 430 provided by the sensor 431, on a reading of the temperature of the suspension in the cooling tank 425 as indicated by the sensor 427 and/or on a reading of the level of the suspension in the cooling tank 425 as indicated by the sensor 426.

The concentrated suspension containing the crystals may directly fall from the separator 430 into the container 435 and the remainder may directly fall from the separator 430 in the reservoir 445. Optionally, the controller 470 may cause opening of a valve 423 allowing transfer of a stabilizing agent and/or other additives from the feeder 417 to the sodium hydrosulfite crystals exiting from the separator 430. Finally, once the sodium hydrosulfite crystals are collected in the container 435 and transferred to the chiller 440, the controller 470 uses a reading from the sensor 441 of the temperature in the chiller 440 to activate or deactivate the chiller 440 until the desired temperature is met and maintained.

Laboratory trials of the industrial process for producing sodium hydrosulfite crystals were performed. Trials A, B, C and D presented in the following Table I were performed, respectively, on Jan. 25, 2019, Feb. 5, 2019, Feb. 6, 2019 and Feb. 12, 2019. Trials A, B and C were primarily intended as proof of concept and to evaluate a yield for the process. Trial D was primarily intended to test a packaging method for the sodium hydrosulfite crystals.

TABLE I

|  |  | A | B | C | D |
|---|---|---|---|---|---|
| Solution before crystallization | Total volume (liters) | 5810 | 5810 | 5810 | 5810 |
|  | Total weight (kg) | 6833 | 6859 | 6856 | 6833 |
|  | Density (g/cm$^3$) | 1.176 | 1.181 | 1.180 | 1.176 |
|  | $Na_2S_2O_4$ concentration (g/L) | 213.1 | 218.7 | 216.1 | 210.0 |
|  | Anhydrous $Na_2S_2O_4$ (kg) | 1238 | 1271 | 1256 | 1220 |
|  | Anhydrous $Na_2S_2O_4$ (%) | 18.12 | 18.53 | 18.31 | 17.86 |
|  | Sulphites concentration (g/L) | 26.46 | 17.64 | 33.39 | 30.24 |
|  | Sulfites concentration (%) | 2.25 | 1.49 | 2.83 | 2.57 |
|  | Sulphites to $Na_2S_2O_4$ ratio (%) | 12.4 | 8.1 | 15.5 | 14.4 |
|  | Adjusted pH | 13.0 | 13.0 | 13.0 | 13.0 |
| Crystallization performance | Anhydrous crystal (kg) | 337 | 361 | 358 | n/a |
|  | Dihydrate crystal (kg) | 407 | 435 | 432 | n/a |
|  | Crystals from initial solution (%) | 5.96 | 6.35 | 6.31 | n/a |
| Separator performance | Anhydrous $Na_2S_2O_4$ (%) | 35.44 | 35.22 | 61.20 | n/a |
|  | Dihydrate $Na_2S_2O_4$ (%) | 42.77 | 42.51 | 73.86 | n/a |
|  | Sulphites (%) | 4.88 | 2.00 | 4.29 | n/a |
|  | Alkali (%) | 1.00 | 1.00 | 1.50 | n/a |
|  | Eau (%) | 51.35 | 54.49 | 20.35 | n/a |
|  | Total solids (%) | 48.65 | 45.51 | 79.65 | n/a |
|  | Withdrawn water (%) | 32.43 | 27.81 | 61.39 | n/a |
|  | Withdrawn liquid $Na_2S_2O_4$ (%) | 38.71 | 33.79 | 75.10 | n/a |
| Remainder of the suspension as a liquid mixture | $Na_2S_2O_4$ concentration (g/L) | 155.0 | 156.6 | 154.43 | n/a |
|  | Sulphites concentration (g/L) | 20.0 | 37.17 | 34.37 | n/a |
|  | pH | 12.85 | 13.34 | 13.30 | n/a |
|  | Density (g/cm$^3$) | 1.150 | 1.161 | 1.161 | n/a |
|  | Anhydrous $Na_2S_2O_4$ (%) | 13.48 | 13.49 | 13.30 | n/a |
|  | Sulfites concentration (%) | 1.74 | 3.20 | 2.96 | n/a |
|  | Alkali concentration (%) | 1.00 | 1.00 | 2.00 | n/a |
|  | Water (%) | 83.78 | 82.30 | 81.74 | n/a |

Table I (Trials A, B and C), the initial solutions had a volume of 5810 liters with a density of about 1.18 grams per cubic centimeters (g/cm$^3$), amounting to on average 1255 kg of sodium hydrosulfite in each trial. The pH was adjusted to 13.

The crystallization performance shows that the resulting dihydrate sodium hydrosulfite crystals amounted to an average 425 kg, a yield of about 33%. An average of 6.2% of the weight of the original solution had turned into the dihydrate sodium hydrosulfite crystals. These results are fairly constant between trials A, B and C, indicating that the performance of the crystallization operations was stable.

In trials A and B, the performance of the decanter centrifuge 230 was not up to expectations: the percentage of water in the produced crystals was high (about 53% on average) and, conversely, the percentage of sodium hydrosulfite was low (about 35% on average). Operational parameters of the decanter centrifuge 230 were adjusted to reduce compaction of the crystals before running trial C. As a result, the percentage of sodium hydrosulfite was in the expected range at 61.2% and the water content was greatly reduced at 20.35%.

The performance of the decanter centrifuge 230 had a negligible impact on liquid mixture formed by the remainder of the suspension. While the original solution had an average concentration sodium hydrosulfite of 216 grams per liter (g/L), the remainder of the suspension after extraction of the sodium hydrosulfite crystals was still fairly high at 155 g/L, this value being sufficient for valorization.

Those of ordinary skill in the art will realize that the description of the process and system for producing sodium hydrosulfite crystals are illustrative only and are not intended to be in any way limiting. Other embodiments will readily suggest themselves to such persons with ordinary skill in the art having the benefit of the present disclosure. Furthermore, the disclosed process and system may be customized to offer valuable solutions to at least some existing needs and problems related to the cost of transportation of sodium hydrosulfite in liquid form, to the energy consumption required to produce sodium hydrosulfite in solid form, to the generation of liquid waste in the production of sodium hydrosulfite in solid form, and to the safety hazards related to the transport and handling of sodium hydrosulfite in solid form. In the interest of clarity, not all of the routine features of the implementations of the process and system are shown and described. In particular, combinations of features are not limited to those presented in the foregoing description as combinations of elements listed in the appended claims form an integral part of the present disclosure. It will, of course, be appreciated that in the development of any such actual implementation of the process and system, numerous implementation-specific decisions may need to be made in order to achieve the developer's specific goals, such as compliance with application-related, system-related, business-related, and regulatory constraints, and that these specific goals will vary from one implementation to another and from one developer to another. Moreover, it will be appreciated that a development effort might be complex and time-consuming, but would nevertheless be a routine undertaking of engineering for those of ordinary skill in the field of industrial processes having the benefit of the present disclosure.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A process for producing sodium hydrosulfite crystals, comprising:
   providing a first water-based suspension containing sodium hydrosulfite in a first concentration;
   separating at least a portion of the sodium hydrosulfite crystals from a remainder of the first water-based suspension to form a second water-based suspension containing the separated sodium hydrosulfite crystals, the second water-based suspension having a second sodium hydrosulfite concentration greater than the first concentration; and cooling the second water-based suspension containing the separated sodium hydrosulfite crystals to a stable temperature.

2. The process of claim 1, wherein providing the first water-based suspension comprises:
   raising a pH of a water-based solution containing sodium hydrosulfite; and
   lowering a temperature of the water-based solution to form the first water-based suspension.

3. The process of claim 2, further comprising filtering a slurry containing sodium hydrosulfite to provide the water-based solution.

4. The process of claim 2, wherein raising the pH of the water-based solution comprises adding sodium hydroxide to the water-based solution.

5. The process of claim 2, wherein the pH of the water-based solution is raised before lowering the temperature of the water-based solution.

6. The process of claim 2, wherein the pH of the water-based solution is raised to a range between 12 and 14.

7. The process of claim 2, wherein the temperature of the water-based solution is lowered in an agitated cooling tank or in a cooling crystallizer to form the first water-based suspension.

8. The process of claim 2, wherein the temperature of the water-based solution is lowered to a range between $-6°$ C. and $10°$ C.

9. The process of claim 1, wherein the sodium hydrosulfite crystals are concentrated by their separation from the remainder of the first water-based suspension.

10. The process of claim 9, wherein the sodium hydrosulfite crystals are separated from the remainder of the first water-based suspension using a separator selected from a decanter centrifuge, a filter-press, a Nutsche filter, a disc filter, and a belt filter.

11. The process of claim 1, wherein the stable temperature of the sodium hydrosulfite crystals is $-12°$ C. or lower.

12. The process of claim 1, further comprising collecting the remainder of the first water-based suspension as a liquid mixture containing an unseparated portion of sodium hydrosulfite initially contained in the first water-based suspension.

13. The process of claim 1, wherein a major fraction of the sodium hydrosulfite crystals are dihydrate sodium hydrosulfite crystals.

14. The process of claim 1, further comprising adding stabilizers to the sodium hydrosulfite crystal after separation from the remainder of the first water-based suspension.

15. The process of claim 1, wherein cooling the second water-based suspension containing the separated sodium hydrosulfite crystals to the stable temperature comprises freezing the second water-based suspension containing the separated sodium hydrosulfite crystals.

16. A system for producing sodium hydrosulfite crystals, comprising:
   a storage adapted to provide a first water-based suspension containing sodium hydrosulfite in a first concentration;
   a separator adapted to receive the first water-based suspension from the storage and to separate at least a portion of the sodium hydrosulfite crystals from a remainder of the first water-based suspension to form a second water-based suspension containing the separated sodium hydrosulfite crystals, the second water-based suspension having a second sodium hydrosulfite concentration greater than the first concentration; and
   a chiller adapted to receive the second water-based suspension containing the separated sodium hydrosulfite crystals from the separator and to cool the second water-based suspension containing the separated sodium hydrosulfite crystals to a stable temperature.

17. The system of claim 16, wherein the storage comprises a cooling tank adapted to receive a water-based solution containing sodium hydrosulfite and to lower a temperature of the water-based solution, the system further comprising:
   a first feeder operatively connected to the cooling tank and adapted to add a pH raising compound to the water-based solution; and
   a second feeder operatively connected to the cooling tank and adapted to add a nucleating agent to the water-based solution to cause a partial precipitation of the sodium hydrosulfite to form the first water-based suspension.

18. The system of claim 16, wherein the chiller is selected from a scraped surface heat exchanger, a screw heat exchanger, a cryogenic freezer, a Nutsche filter, a $N_2$ chiller and a $NH_3$ chiller.

19. The system of claim 16, further comprising:
   a valve connecting the storage to the separator;
   a controller operatively connected to the storage, the valve, the separator and to the chiller, the controller being configured to:
   cause an opening of the valve to allow a transfer of the first water-based suspension from the storage to the separator;
   initiate an operation of the separator when the first water-based suspension is received at least in part of the separator; and
   initiate an operation of the chiller when separated sodium hydrosulfite crystals are received at least in part in the chiller.

20. The system of claim 19, further comprising a first sensor of a level of the first water-based suspension in the storage and a second sensor of a temperature of the first water-based suspension in the storage, the controller being configured to cause an opening of the valve to allow a transfer of the first water-based suspension from the storage to the separator when, concurrently, the first sensor indicates that there is a sufficient amount of first water-based suspension in the storage and the second sensor indicates that the first water-based suspension is at a sufficiently low temperature.

* * * * *